(12) United States Patent
Galvez (10) Patent No.: US 8,821,597 B1
(45) Date of Patent: Sep. 2, 2014

(54) METHOD AND APPARATUS FOR INCREASING ENERGY OUTPUT OF SUGAR BAGASSE

(71) Applicant: Adolfo J. Galvez, Miami Beach, FL (US)

(72) Inventor: Adolfo J. Galvez, Miami Beach, FL (US)

( * ) Notice: Subject to any disclaimer, the term of this patent is extended or adjusted under 35 U.S.C. 154(b) by 0 days.

(21) Appl. No.: 13/735,461

(22) Filed: Jan. 7, 2013

Related U.S. Application Data (63) Continuation of application No. 12/844,336, filed on Jul. 27, 2010, now abandoned.

(60) Provisional application No. 61/229,003, filed on Jul. 28, 2009.

(51) Int. Cl.
*C10L 5/06* (2006.01)
*F23K 1/00* (2006.01)

(52) U.S. Cl.
CPC .................................... *F23K 1/00* (2013.01)
USPC ........................................................... 44/594

(58) Field of Classification Search
None
See application file for complete search history.

(56) References Cited

U.S. PATENT DOCUMENTS 3,373,679 A * 3/1968 French ............................ 100/37
4,047,489 A * 9/1977 Voorheis et al. ............... 110/342
4,363,636 A * 12/1982 Bouvet et al. .................... 44/589

OTHER PUBLICATIONS abdel-rehim et al, solar drying of bagasse pulp, 2007, journal of applied sciences research, 3(4) pp. 300-306.*

* cited by examiner

*Primary Examiner* — Melvin C Mayes
*Assistant Examiner* — Stefanie Cohen
(74) *Attorney, Agent, or Firm* — H. John Rizvi; Gold & Rizvi P.A.

(57) ABSTRACT

The present invention relates to a method for and apparatus for processing sugar bagasse which produces a significantly increased level of thermal output. More specifically, the thermal output of the processing method and the apparatus used therefore produces far more energy for transfer to an electricity generating module of the plant for generating electricity.

12 Claims, 7 Drawing Sheets

METHOD AND APPARATUS FOR INCREASING ENERGY OUTPUT OF SUGAR BAGASSE

CROSS-REFERENCE TO RELATED APPLICATIONS

This application is a continuation-in-part of U.S. patent application Ser. No. 12/844,366 filed on Jul. 27, 2010, and entitled Method for Handling and Processing Sugar Bagasse and a Sugar Can Processing Plant Therefor, the teachings of which are incorporated herein by reference in their entirety, which was a continuation of and claims priority from U.S. Provisional Patent Application Ser. No. 61/229,003, filed on Jul. 28, 2009, the teachings of which are also incorporated herein by reference in their entirety.

BACKGROUND OF THE INVENTION

1. Field of the Invention

The invention relates generally to a method for processing sugar bagasse in a sugar cane processing plant. More particularly the invention is directed to a method for processing sugar bagasse in a manner which significantly increases energy output and an improved sugar cane processing plant therefor is also disclosed.

2. Description of the Prior Art

Sugar cane is a subtropical and tropical crop that prefers lots of sun and lots of water—provided that its roots are not waterlogged. Sugar cane can average 12 months to reach maturity, although time varies widely around the world, taking anywhere from 6 months to 24 months. Where sugar cane differs from many crops is that it regrows from the roots so the plant may grow through many cycles before it no longer regrows.

Sugar and fiber content also vary in sugar cane, without regard to source of origin. New varieties with early maturity, such as Cameroon sugar cane (low in sugar, high in fiber, normally used for animal feeds) is typically ground twice a year for the production of ethanol and electricity in agro-industrial regions.

Sugar cane is harvested by chopping down the stems while leaving the roots behind for regrowth potential. Harvest is usually conducted during the dry season and the length of the harvest may range from as little as 2.5 months up to 11 months.

Processing the sugar cane involves several stages, beginning with the extraction of the cane juice. In many processing plants, the cane is ground and crushed in a series of large roller mills. The number of mills varies depending on the amount of juice to be extracted and/or the grinding capacity needed. The sweet juice gushes out of the cane and the cane fiber remaining is pumped to a boiling house for the production of sugar, ethanol and/or sub-products, as known, and the cane fiber is then sent to and utilized as fuel for the boilers. In other processing plants, a diffuser is used.

The juice extracted at the mills, normally from first and second mills, is high in yield. The extracted juice is pumped to a boiling house, after dirt and solid impurities are removed from the juice. This cleaning process is known as purification of the juice. In the raw sugar industry, lime and heat are the agents almost exclusively used for this purpose, with a small amount of soluble phosphate generally being added into the process.

The extracted juice goes through a lime mixing system, with the heavy, thick lime mud created going to a conical bottom of a settling tank and the lighter cold, limed juice which flows along the top is pumped to the juice heaters. The heavy, thick lime mud from the conical bottom is washed out during periodic cleaning of the system. Thus a secondary system is necessary for continuous plant operation.

Pursuant to the above defined method, a sticky, brown sugar product is formed, which is further refined when it arrives in it country of destination. Additionally, since all the sugar cannot be removed from the juice, a sweet by-product, molasses, is created as well, which is turned into a cattle feed or is sent to a distillery where alcohol is made.

Bagasse is the fibrous residue remaining after the sugar cane is crushed to extract juice therefrom and is currently used as a renewable resource in the manufacture of pulp, paper products and building materials. For each 100 tons of sugar cane crushed, a sugar factory produces nearly 30 tons of wet bagasse. Historically, bagasse processing plants have had harsh working environments due to the pulp mill process. The plant also requires electricity and steam to run, both of which are generated using this bagasse fiber.

Bagasse has several possible uses including the possibility of burning it in large furnaces where much heat is released and used in turn to boil water to create high pressure steam. The steam generated drives a turbine to make electricity and to create low pressure steam for the sugar making process. A substantial impediment to wide scale use of bagasse is difficulty in depithing, a process wherein pith is separated from the bagasse fibers.

The traditional way of handling bagasse from the last mill is as follows: it is transported to boilers, with an excess of 10-15%, in a well balanced sugar processing plant being carried to a bagasse warehouse. When there is a lack of bagasse from the mills, the bagasse from storage is carried back to the boilers and by using a front-end loader it is either dumped into a reclaim hopper conveyor or directly into a floor level conveyor which carries it to boiler feeders. When the storage reserves become low, oil must be burned to maintain production.

In the present invention, pulverized bagasse is circulated back to the fiber fuel warehouse from the boilers, maintaining 70-75% of its capacity in reserve, with the reserve bagasse being stored a in dozen or so piles 40-50 feet high to protect it from heavy wind, rain such as that occurring during the rainy season. Each pile is covered with a stainless steel top and when any of the dozen piles in the storage system drops to a moisture content of approximately 30-40% by weight, the bagasse is pulverized and taken to the fiber fuel warehouse for further drying.

For back up of the bagasse reserve at the sugar plant, sub-systems operating all year in the region are provided, using identical technology to store the waste bagasse fibers, with it being trucked to the bagasse waste piles station.

As a power plant produces electricity, fossil fuel is typically used, such fuel contaminating the atmosphere. The power station or plant must also dump much low grade heat. Such dumping contributes to global warming. In the proposed cane sugar processing plant, bagasse fuel is renewable and the waste gas it produces, essentially $CO_2$, is taken up by growing sugar cane. Also, the plant's use of low grade heat (called cogeneration) makes a well-run sugar cane estate environmentally friendly.

Considering the presently high price of oil, keeping production at low cost, and considering how harmful gases produced by the burning of oil are to the environment, seeking alternative sources of energy has become extremely important. New environmentally friendly sources of energy are believed to reduce global warming, as well as reducing dependence on foreign oil, and fossil fuel as sources of energy.

It will take years before 3$^{rd}$ world nations will be able to use new, more sophisticated technologies. Instead of waiting, the use of bagasse as a clean and renewable energy would be available, which bagasse could produce not only sugar, but also ethanol, sub-products, as well as producing electrical power. It could be a new start for prosperity for many underdeveloped countries.

Many research efforts have attempted to use bagasse as a renewable feedstock for power generation and for the production of bio-based materials. A primary fuel source for sugar mills is the main use for bagasse, which may be burned to produce sufficient heat energy to supply all the needs of a typical sugar mill, with energy to spare. To this end, a secondary use for this bagasse waste product is cogeneration, the use of a fuel source to provide both heat and energy. Both things are used in the mill, and excess electricity is created as well, which typically is sold to a public electricity grid.

A typical power plant facility uses bagasse and urban wood waste as fuel to generate enough energy to power its large milling and refining operations, as well as to supply renewable electricity. Such facility reduces dependence on oil by more than one million barrels of oil per year. Such facility thus saves approximately 10 of 12 months of oil dependency, also saving 80-85% in energy costs per year for the surrounding region of the plant, i.e., towns and cities associated with the raw sugar processing plant.

Ethanol produced from the sugar cane is, for example, a popular fuel for use in Brazil.

There are several known methods for using bagasse as a secondary product during the sugar cane processing. For example, a method for preparing and using a combustible fuel product using sweet sorghum is known. A sorghum variety high in sugar, high in biomass, and low in nitrogen is first processed to remove a majority of sugar therefrom.

The remaining lignocellulose residue, referred to as bagasse, is presently converted into combustible pellets or is alternatively stored for future pelletization. Storage is accomplished by first piling the bagasse on a hard surface. The bagasse is then compressed to form a compacted mass in the form of a pellet. Compression of the bagasse frees air trapped in the pile, hindering oxidative degradation by bacteria and other microorganisms.

Even though the above mentioned methods and technology presently used define a suitable approach for maximization of the natural resources used in a sugar cane processing plant, a method for processing bagasse in a more environmentally friendly, and more profitable, manner is still desired.

SUMMARY OF THE INVENTION

The present invention is directed to a method in which bagasse is broken into small pieces in a pulverizer, and transported to a fiber fuel warehouse, and as a pulverized mixed fuel of bagasse and waste it is carried by an automatic controlled system to boiler feeders.

The present invention also introduces a new methodology called retrofeeding. Retrofeeding is a dry system for use of pulverized bagasse, and other available lignocellulose wastes which can maintain a continuous and steady flow of fuel to the boilers from a single source: a fiber fuel warehouse. Any lack of bagasse is substituted for by waste fibers stored in piles at the plant or obtained from sub-systems in the region.

In the present invention, the cane fiber or bagasse is not carried directly to the boilers but to a pulverizer to reduce its volume as well as to increase its surface area, with bagasse being a very bulky fiber from which smaller particles are very much desired to increase areas of contact favoring evaporation of moisture therefrom.

This invention is directed to a method for processing bagasse into a pulverized form for provision to boilers of a sugar cane processing plant, making the operation of the plant more economical and stable by increasing energy output through the process of pulverization, generating electricity for use in an agro-industrial region that usually surrounds the plant as well.

In one general aspect of the present invention, its comprises the generation of two different sources of energy: a) from sugar or ethanol, and b) from electricity generated by using a fuel in the form of a pulverized mix of bagasse, wood chips, fiber residues from a sugar cane field, and any other dry lignocellulose waste available.

Another aspect of the present invention provides a system which is operated through use of pulverized bagasse, operating 10 out of the 12 months a year without burning oil which provides a net calculated saving of 83% of oil use per annum, while cutting greenhouse gases and reducing global warming.

Yet another aspect provides a new raw sugar factory capable of generating between 50,000-60,000 Kw/hr. throughout an entire year, with the a potential of assigning 11,500-12,500 Kw/hr to sugar production with the potential excess waste fiber fuel being used to generate, through use of a condensing turbo-generator, sufficient electricity to maintain the provision of electricity for an agroindustrial region surrounding the processing plant.

In a further aspect of the present invention, the method for utilizing increased energy from bagasse and other available lignocellulose waste from a sugar processing plant comprises the steps of:

pulverizing a supply fuel material comprised essentially of bagasse and any other available lignocellulose waste into a state comprising small particulate matter having a significantly large surface area;

drying the pulverized waste to a moisture content no greater than 10%;

providing the pulverized bagasse and lignocellulose waste to a boiler of the sugar processing plant for burning, for producing electrical power for the plant to reduce dependence on fossil fuels;

providing excess created electrical power produced in a neighboring power plant to an agroindustrial region surrounding the processing plant to also reduce dependence on fossil fuel; and producing $CO_2$ from burning of the pulverized waste for use by new growth of sugar can surrounding the plant.

These and other aspects, features, and advantages of the present invention will become more readily apparent from the attached drawings and the detailed description of the preferred embodiment, which follow.

BRIEF DESCRIPTION OF THE DRAWINGS

The preferred embodiment of the invention will hereinafter be described in conjunction with the appended drawings provided to illustrate and not to limit the invention, where like designations denote like elements, and in which.

DESCRIPTION OF THE PREFERRED EMBODIMENT

Figure 1:
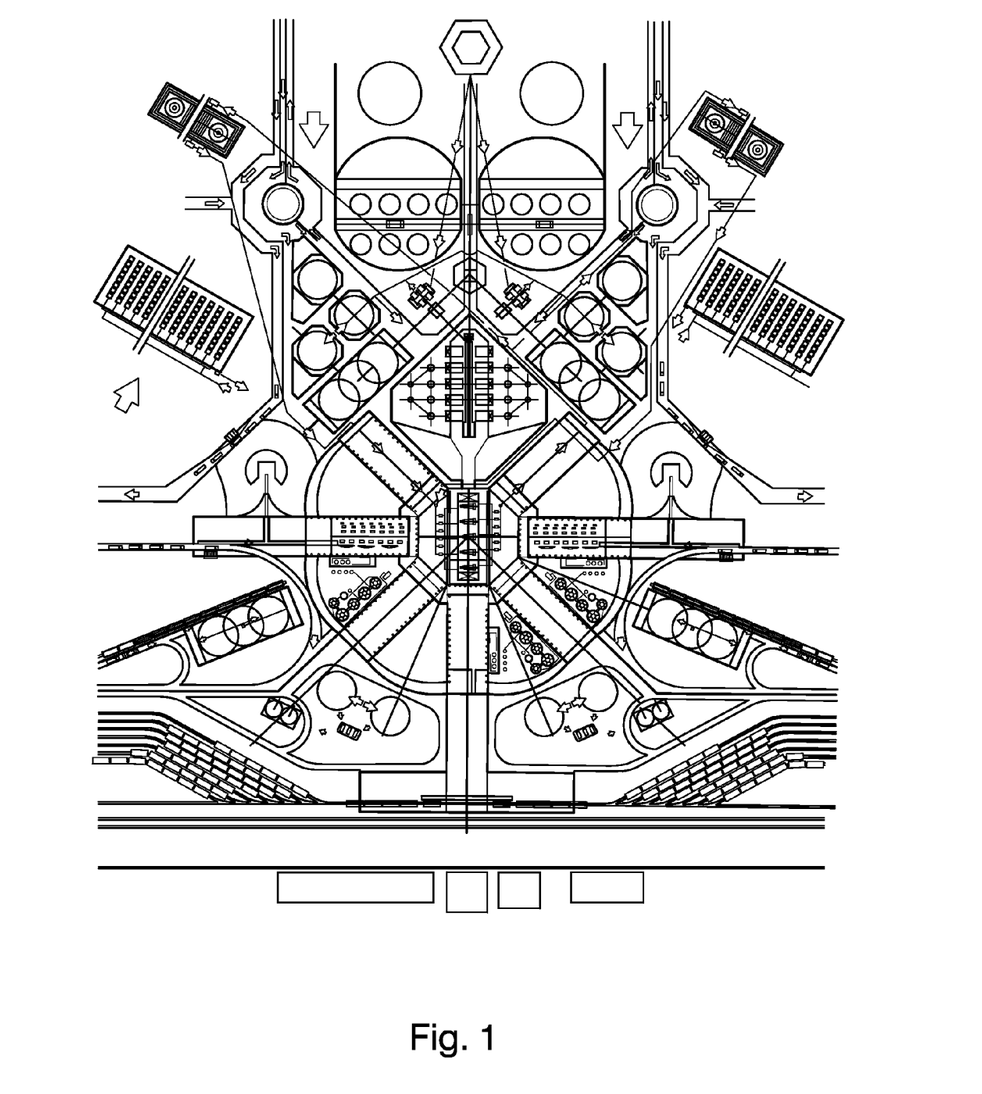
FIG. 1 is a general top plan view of a sugar cane processing plant made in according with the teachings of the present invention, showing a schematic layout of the plant including the improved bagasse processing section, the section of the plant that processes bagasse with wood chips and other available lignocellulose fiber residues or waste into pulverized fuel material, as well as the way in which the pulverized fuel material flow is moved through the plant to a warehouse using hoppers and conveyors, and from the warehouse to boilers of the plant, when the bagasse has finished being processed according to the method of the present invention, by an automatic control system.
Figure 2:
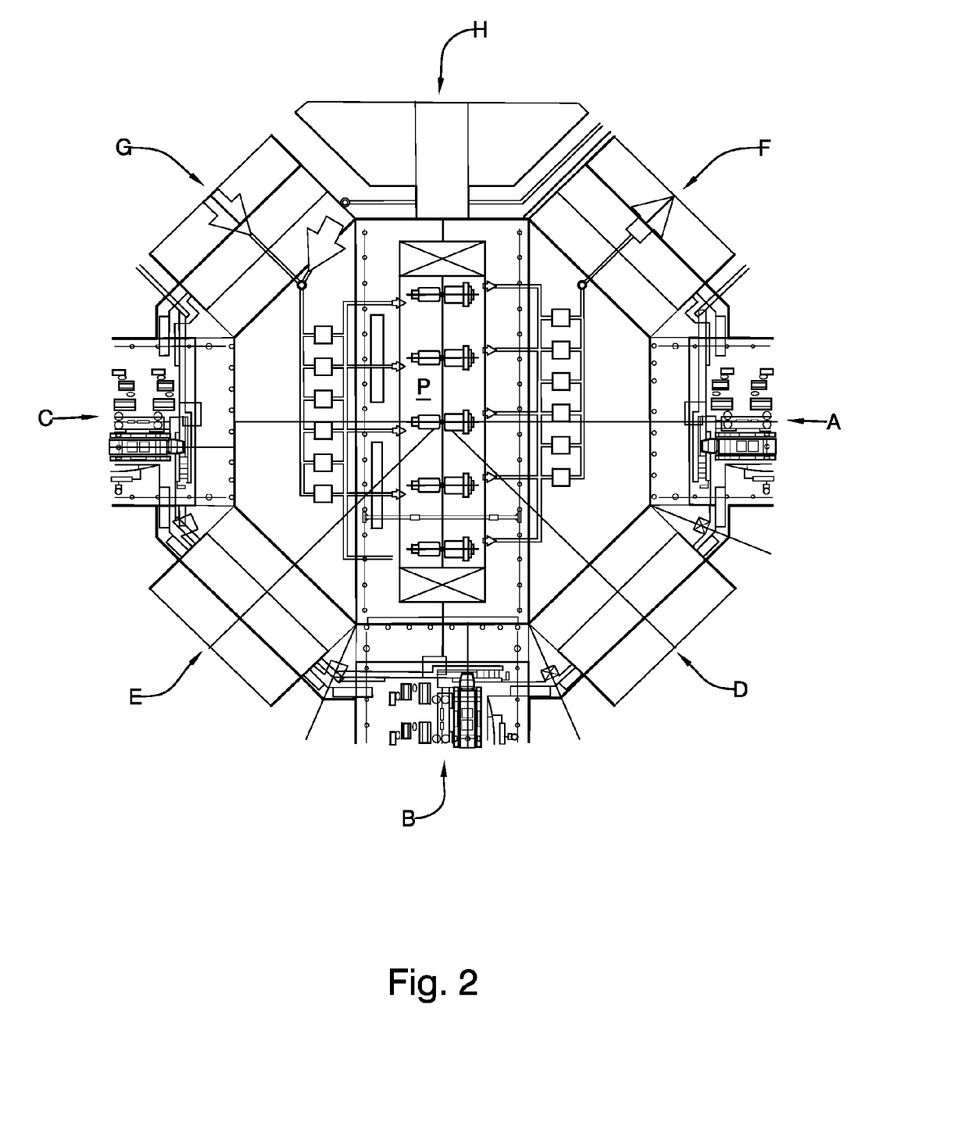
FIG. 2 is a top plan view of a power plant (P) in the center of the factory, and eight modules or narrow buildings, the modules (A)(B)(C) showing two last mills with an improved discharge bagasse chute system, an improved bagacillo-mud processing system and the main bagasse belt conveyor carrier.

Shown throughout the Figures, the invention is directed to a sugar cane processing plant. FIG. 2 shows the power plant (P) in the center of the factory, and eight modules or narrow buildings, the modules (A)(B)(C) showing the final mills with improved bagasse discharge chute systems, an improved bagacillo-mud processing system and a main bagasse belt conveyor carrier.

FIG. 2 also shows five turbo-generators, operating in the improved system, as follows. The turbine of the turbo-generators receives live steam from a boiler of the system at approximately 850 psig, with an approximate temperature of 900° F. Superheated steam powers the mill's turbines, the main source of exhaust steam, at 15 psig, for raw sugar and/or ethanol production.

Five areas or modules are shown in blank for lack of applicability to the subject application and are not related to the method for handling and processing bagasse or additional waste fiber fuel, nor are they described. They are related to the sugar cane processing plant and comprise free areas (H) for equipment related to the power plant, in modules (G) and (F) the ground and first levels have the main equipment and auxiliaries related to the boilers and power plant, at the opposite side near the grinding mills the warehouses for electrical and mechanical spare parts are located, and at higher levels the lockers and showers, engineering offices, restaurants, and other improved facilities for a modern factory. Lateral to mills (B) are two production modules (E) and (D).

Six pumps are also provided, one for cold water from a cooling tower at an open field to the turbo-generator's condenser, and returning hot water pumps (3), two are spares, feeding back to the cooling tower.

All five turbo-generators have automatic condensing/extracting turbines. The partly expanded steam is extracted at different points for generating power to the mills, energy and heat for production, feed water reheating cycle for boilers, among other processes. The fifth may comprise a condensing unit with a steam rate (SR) below 10 lbs/Kw/hr.

At both ends, there are open areas for rigging with a power plant traveling crane in line with modules (B) and (H) with same span for crane railing at different levels with another traveling crane from either side helping to speed assembly and construction. This improved arrangement of modules in line, using more than one traveling crane and two free areas for rigging help meet the completion of activities on schedule.

Figure 3:
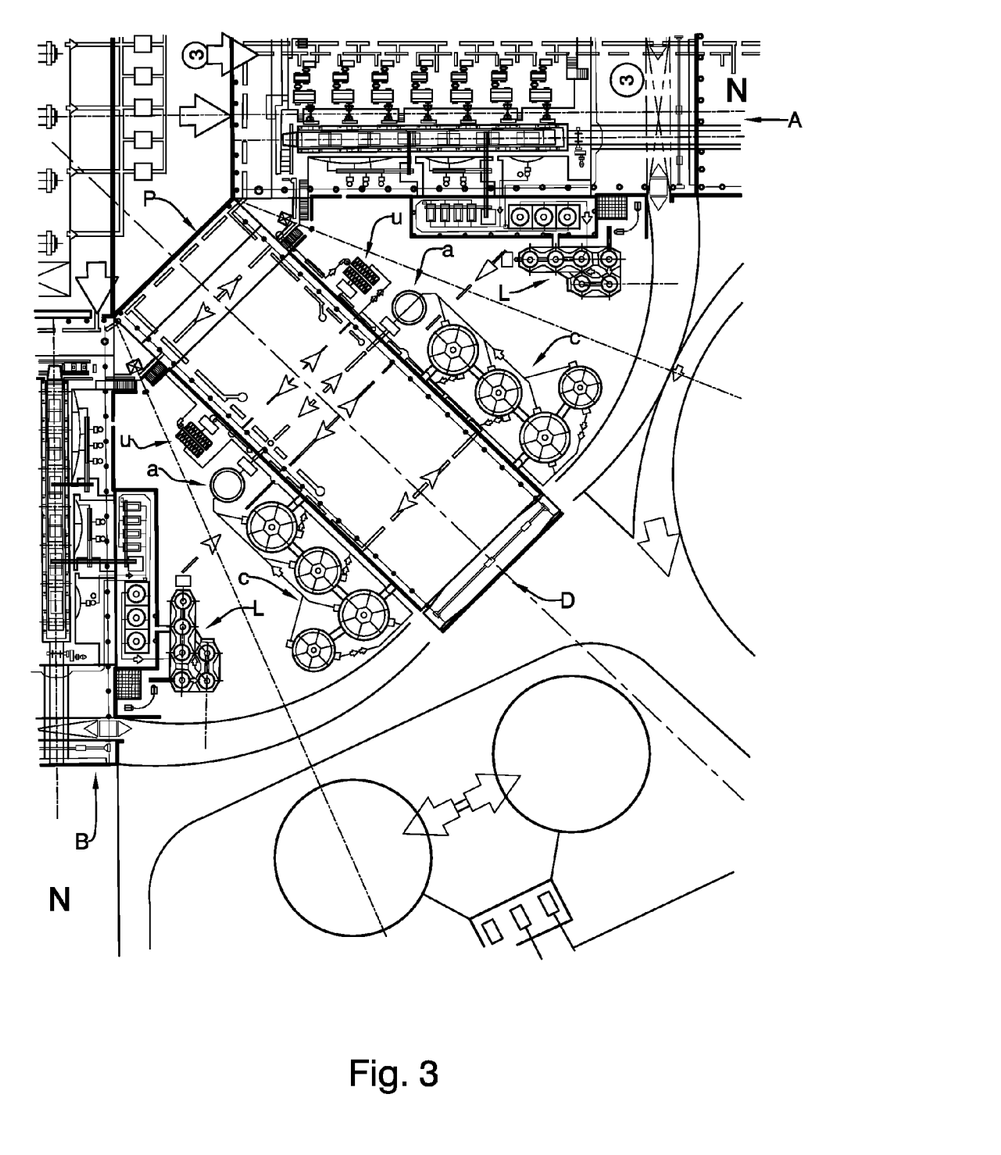
FIG. 3 is a top plant view showing the improved arrangement of the equipment used for the purification of the juice. The equipment is installed in open areas between modules, with product flowing from one station to another through the modules. The main equipment is identified with letters: liming tank system (L), clarifiers (c), juice clarifier tank (a), and bagacillo-mud rotating mixer (u). Other letters identify locations: the power plant in the center (P), grinding mills (B) and (A), and production modules (D) and (E), with one to either side of mills (B).

In an improved arrangement of the equipment shown in FIGS. 2-3 is used for the purification of the juice, the equipment is installed in open areas between modules. The product flows between processing stations through the modules. The main equipment comprises liming tank system (L), clarifiers (c), juice clarifier tank (a), bagacillo-mud rotating mixer (u). Relative location within the system may be gleaned from the power plant in the center (P), grinding mills (B) and (A), and the processing module (D) and (E) to either side of mills (B), with the equipment being oriented at different levels for production.

Figure 4:
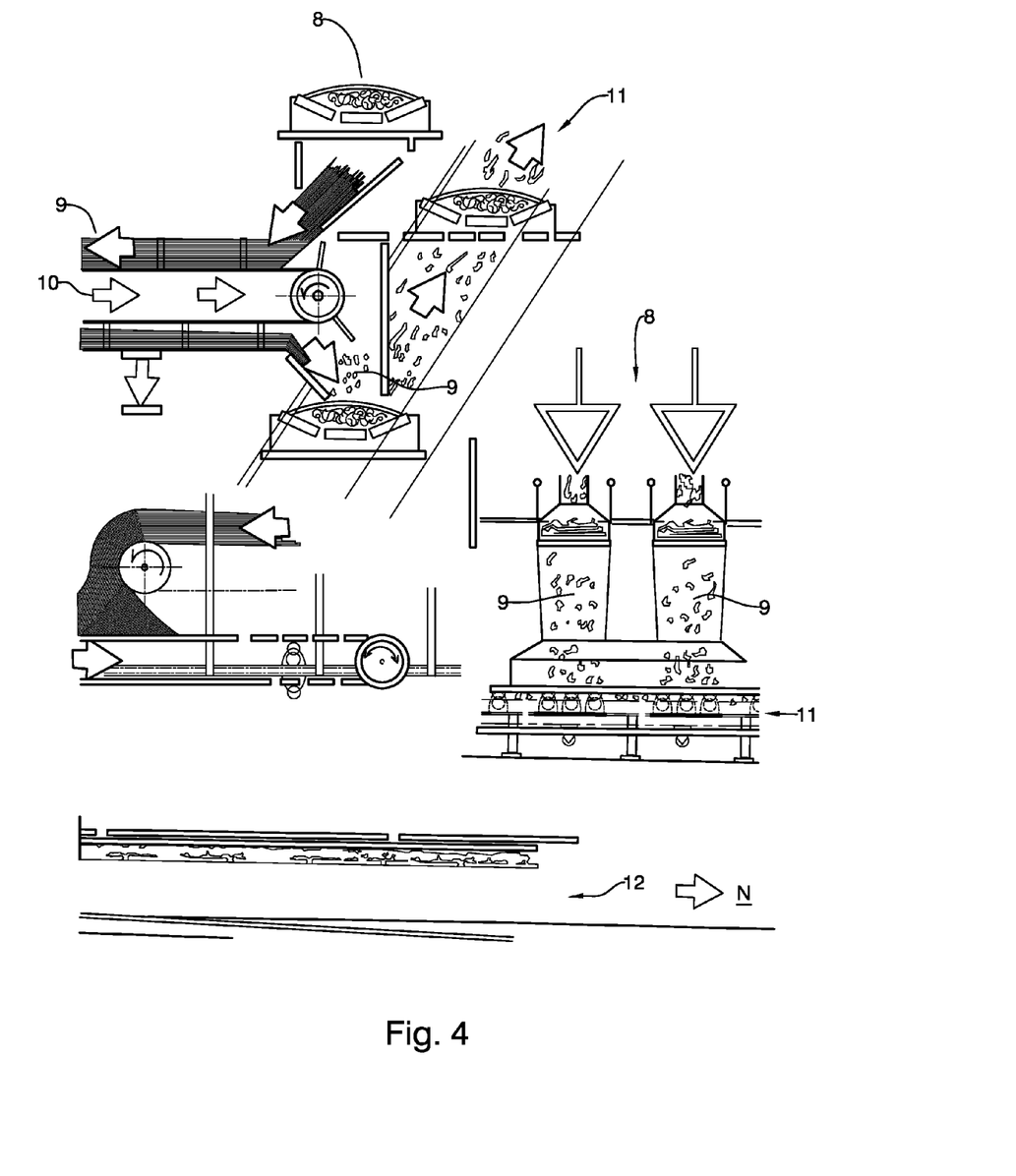
FIG. 4 shows a schematic of the flow of pulverized fiber fuel from warehouse (N) carried by a transfer conveyor (8) to the top of a drag conveyor (9), close to a driving heat shaft. Pulverized fiber fuel is dropped to the bottom of a drag slat conveyor, together with loose fibers carried by an inclined conveyor (10). The fibers are distributed to the boiler feeders. At a short distance from a tail shaft and through a hopper, excess fuel is transferred to conveyor (11), and conveyor (12) carries the excess fibers back to warehouse (N).

Pulverized fiber fuel from warehouse (N) is carried by a transfer conveyor (8) to the top of a drag conveyor (9) as shown in FIG. 4, which is positioned near the driving heat shaft, the pulverized fiber fuel is dropped to the bottom of the drag slat conveyor, together with loose fibers carried by inclined conveyor (10), the fibers being returned to a tail shaft where they are distributed to boiler feeders. At a short distance from the tail shaft, via a hopper, excess fuel is transferred to conveyor (11), with the adjacent conveyor (12) carrying excess fibers to the warehouse (N).

Figure 5:
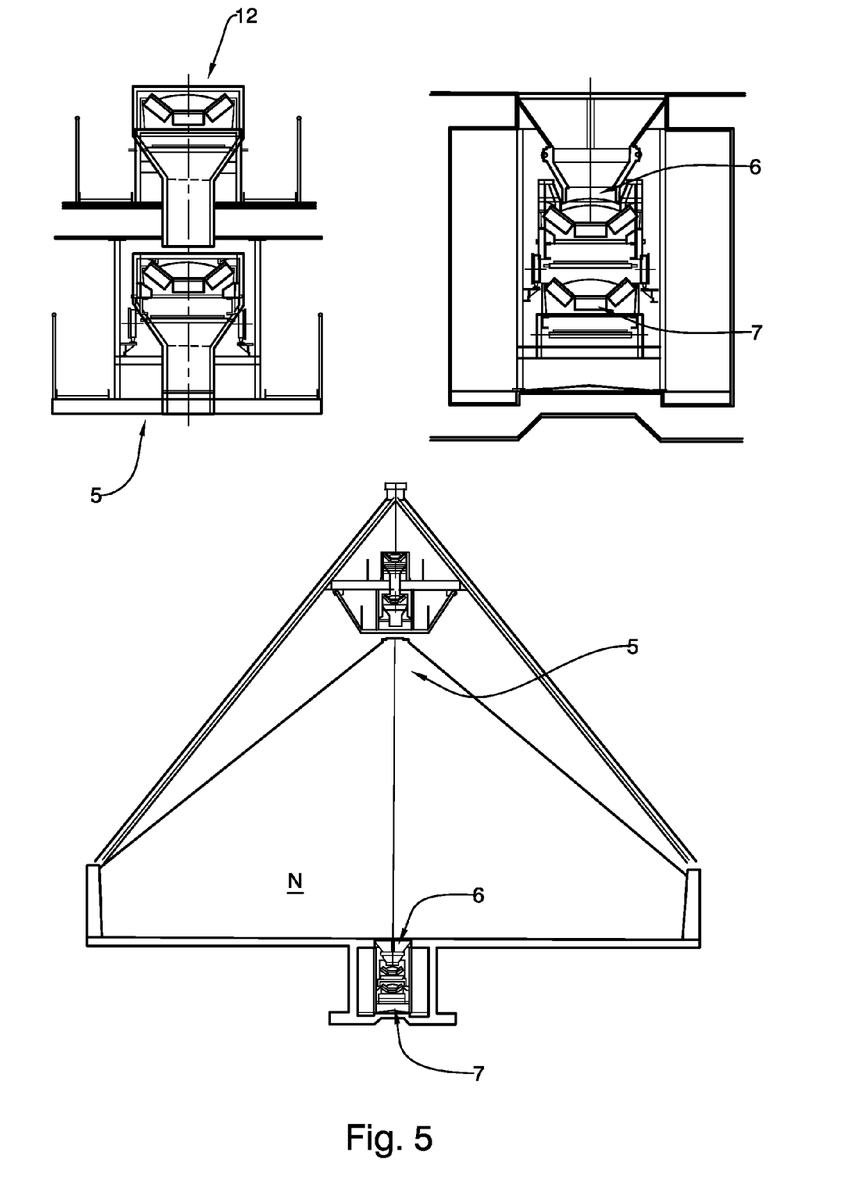
FIG. 5 shows a schematic front view of the pulverized fuel flow inside the Warehouse (N): conveyor (12) discharges in the center of the warehouse (N) the fiber fuels are delivered to a retractable distributor conveyor (5), hanging from the support structure thereabove. It also shows a tunnel underneath warehouse (N) where the pulverized fuel flows through hoppers, to a retro-feeding automatic control system (6) and (7) for boiler feeders.

FIG. 5 shows a schematic front view of the pulverized fuel flow inside warehouse (N): the conveyor (12) discharges the fiber fuels to a retractable-distributor-conveyor (5) in the center of the warehouse (N), conveyor (5) hanging from the support structure thereabove. It also shows a tunnel beneath warehouse (N) where pulverized fuel flows through hoppers to a retro-feeding automatic control system (6) and (7) of the boiler feeders.

Figure 6:
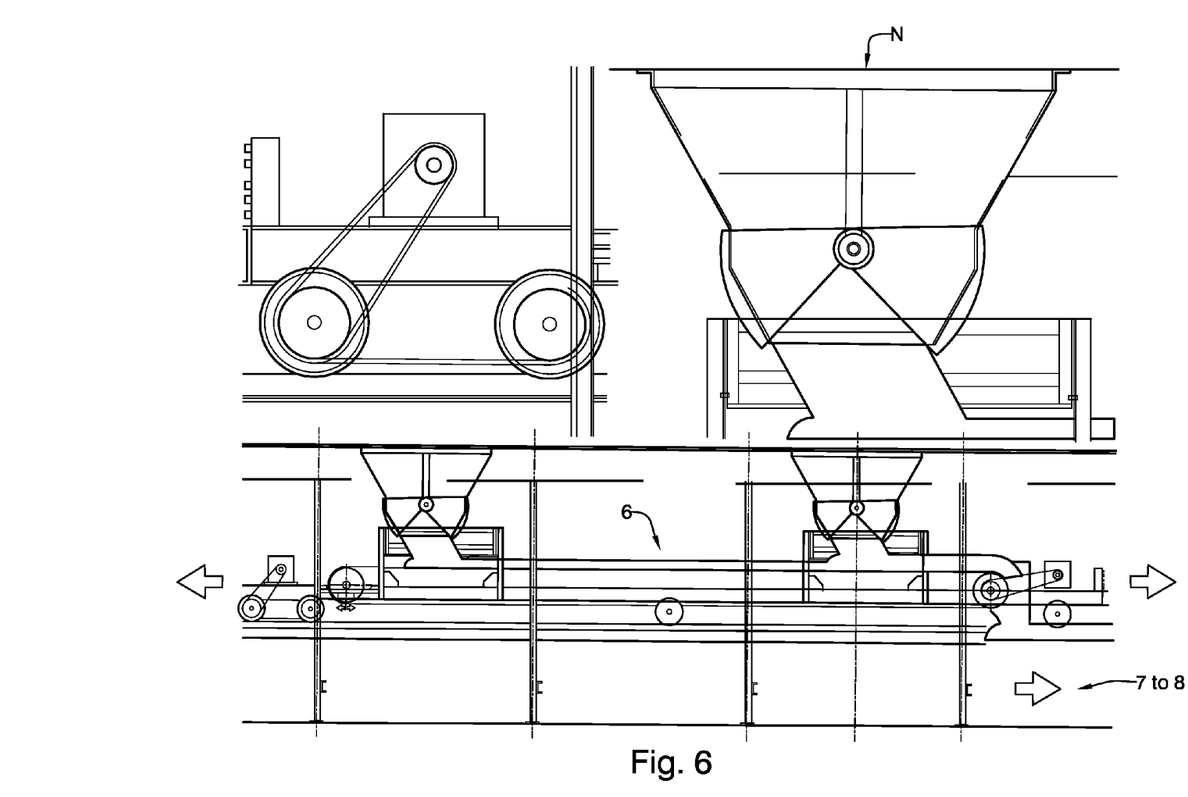
FIG. 6 shows a schematic front view of improved equipment for retro-feeding the pulverized fiber fuels wherein part of a hopper can be shaken to weed out fiber fuels when it opens with the light fiber fuel flowing out to the retractable variable speed conveyor (6), which has a four-wheel drive mounted to railing above reclaim conveyor (7).
Figure 7:
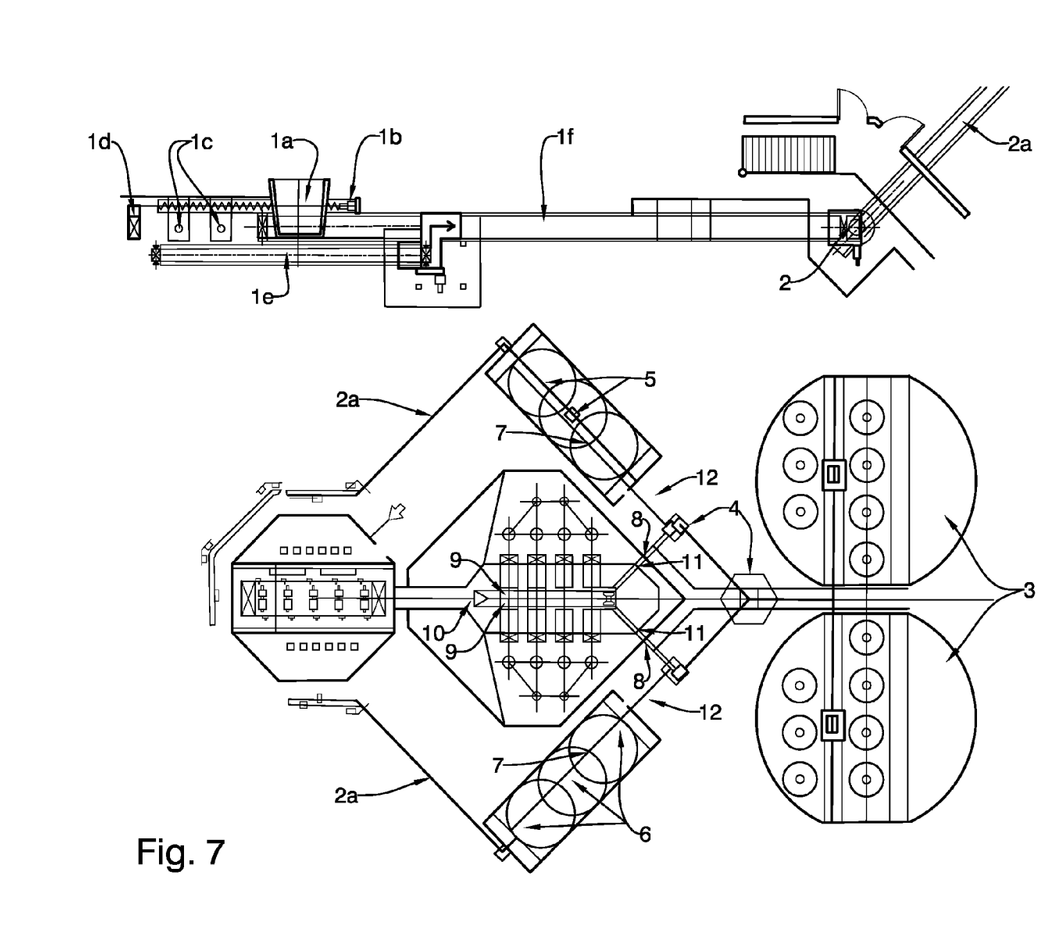
FIG. 7 is a top schematic view of the flow of fiber fuels comprising bagasse from a last grinding mill through an improved chute to a transfer tower where the bagasse is pulverized and carried to a distributor conveyor inside a warehouse, and, from the same chute, the pulverized waste fibers from a pile storage station are discharged. The pulverized fiber fuels from the warehouse travel through hoppers and a controlled flow of the fiber fuel is carried to boiler feeder with a controlled excess of fiber fuels being returned to the warehouse.

FIG. 6 shows a schematic front view of improved equipment in the tunnel for retro-feeding pulverized fiber fuels. Part of the hopper is swingable to shake out the fiber fuels, and when it is opened, the light fiber fuel begins flowing onto retractable variable speed conveyor (6), which has a four-wheel drive mounted to railing on top of reclaim conveyor (7).

Heaters are found in the first level of modules (D) and (E), at the same level as evaporators are found, near clarifiers (C) to both sides of module (D), as shown in FIG. 3.

Cold limed juice is heated by vapors from the evaporators using low pressure steam. The temperature of the cold limed juice is raised from 80° F. to 150° F. by sets of cooperating heaters or heater systems, using vapor from a second heater system, in line with a second set of heaters at 200° F., taking vapor from a first heater system, and a set of rectifier heaters at 216° F. using the low pressure steam provided at 15 psig.

During purification of the juice at the clarifiers, the juice mixed with bagacillo, very small, fine particles of bagasse, is processed in a rotating mixer, and thick mud created is pumped to filters to extract juice. Cleaned juice is sent for further processing, and the dry-mud, known as cachaza, is taken back to the fields for reuse or is used for the production of "raw wax". The clean juice from the clarifiers is comprised of (+/−) 85% water, before it is pumped to evaporators, where ⅔ of the water is removed using a vacuum extraction system.

As disclosed herein the liming system, the clarifiers, the rotating mixer, the juice clarifiers, any auxiliary tanks and their pumping systems are installed in open spaces between modules. This allows for cranes to be used to assemble the necessary equipment, creating desired space within modules at the ground level.

Syrup from the last of the evaporators is then pumped to a vacuum pan system. It now comprises approximately 65% solids, and 35% water. More water is boiled off using the pan system until crystallization conditions are reached, and, in most cases, sugar dust is added to initiate crystallization. The massecuite, defined as a sugar/molasses mixture before removal of molasses therefrom, from the vacuum pan system is then sent to and cooled in crystallizers via circulating cool water. Completion of this holding period is indicated by super saturation of the mother liquid, determined by laboratory analysis.

The massecuite is then drawn into a centrifugal mixer, having slowly revolving arms therein to prevent sugar crystals from settling.

The sugar crystals are separated by centrifugal force with the raw, crystalline sugar being transported to a warehouse, and the molasses being stored in tanks General details and description of main elements of the improved system, how the system works, indicators, and parameters are to only serve as a general guide for layout, and calculations (+/−) 3% applicable to the invention and should not be construed as limiting:

1—Bagasse from Last Mill Discharged Through a Chute to the Main Belt Conveyor:

In FIGS. 1-7, Cascade chute (1a) discharges 75-80% of the bagasse to a belt conveyor, with a remainder of its volume which will not process through perforations in a screw conveyor (1b), being carried to two variable speed vibrating screens (1c), where the number and size of the fine parts of bagasse known as bagacillo are screened and blown through piping to mixer (u), where they are mixed with the mud from clarifiers (c).

The procedure is traditional in the sugar industry, but does not presently include use of a cascade chute with perforations therein in an improved arrangement.

Elements of the improved system: chute (1a), screw conveyor (1b), vibrating screens (1c), blower (id), auxiliary belt conveyor (1e), main belt conveyor (1f), and transfer tower (2).

From here, pulverized bagasse is transferred to warehouse (N). Preferred parameters of note are as follows:

Bagasse comprises sugar cane fibers remaining after juice extraction: approximately 25% of processed cane with another approximately 5% being collected from the sugar cane field, for a total of approximately 30% fiber accumulation from the cane Screw conveyor transports: 20-25% of total bagasse Variable speed screen: 6-15 lbs/min. bagacillo/1134.31 Mt/day of cane Bagacillo from bagasse to mixer: 800 lbs/hr/1134.31 Mt/day of cane Blower: 1,500 ft.$^3$/min. of air: 100 cu. ft. of air/lb of bagacillo Main belt bagasse conveyor to transfer tower: 25% bagacillo Bagasse from vibrators to the mixer: 9-11% lb/hr/1134.31 Mt/day of cane 2—Last Mill Bagasse to Pulverizer within Transfer Tower:

The bagasse from the cascade incline chute (1a), and excess bagasse returning from the screen vibrators (1c) to the main belt conveyor (1f), is carried to a hopper of a pulverizer to break the fibers into very small particles in transfer tower (2), where size of the pulverized particles is controlled to be no greater than ⅛ inch in diameter.

2a—Transfer the Pulverized Bagasse to Fiber Fuel Warehouse:

An incline conveyor (2a) carries pulverized bagasse to transfer tower (2), discharging to a horizontal belt conveyor, and to cascade chute (1a), from which it is distributed storage areas by retractable belt conveyor (5).

The improved procedures and/or method to pulverize bagasse is not traditional in the sugar industry, and bagasse volume can be reduced by 25-30% through application thereof, increasing storage capacity, and providing small particulates of fiber fuels having a size no greater than ⅛ inch in diameter, increasing the surface area exposed for evaporation, helping to reduce moisture content via solar heating. A cyclone furnace may be an alternative for increased performance. Preferred parameters of note are as follows Capacity of pulverizer at transfer tower: 25% of Mt/hr of ground sugar cane.

Conveyor maximum angle of inclination: 17°.

Backstop built into electric motor in the event of power failure.

Discharge to pulverizer: incline conveyor to horizontal along 4 feet upstream of discharge point.

Drive pulley in the main conveyor to tower: grooved rubber lagged.

Conveyor belt: 2 ply min. and fire resistance-flame retardant 3/16"×1/16" covers Maximum conveyor speed: 300 feet per minute Electric motor-speed reducer: twin disc fluid coupling Belt cleaning devices: electric rotary brushes Conveyor at an open field protecting covers: corruption resistant 22 GA minimum Emergency safety device: zero speed switch-Crouse EMER. pull cord switches Electric motors: totally enclosed: 1750 rpm output, 440V, 3 Ph, 60 Hz.

3—Piles Station at an Open Field in an Area Close to the Fiber Warehouses and Boilers Waste from fiber fuels are cut into smaller pieces and transported for dumping into piles (3). A front-end loader and portable attached shredder feeding a folding crawler conveyor are used for creating piles 40 feet high, each protected from rain and wind with a self adjusting thin, stainless steel cover, like a hat.

The cover is removed only during optimal weather conditions, until all waste fibers from the pile are moved to the fiber fuel warehouse.

A reclaim operation proceeds as follows: the waste pieces are dumped from a front-end loader to a hopper-bottom car, a minimum of 8 feet wide at the top, and 15 feet long, with an open bottom moving on tracks with self traction on two wheels with the piles being located along sides of the tracks. The hopper drops its content onto a slow moving receiving conveyor mounted beneath the tracks, this receiving conveyor discharging to an incline conveyor, which carries the waste to a roller mill pulverizing station along the way to fiber fuel warehouse (N).

The presently preferred arrangement uses equipment already in the market.

Capacity of the pile for 45°-40 feet high: volume 66,960 ft.$^3$
Capacity of the pile for 50°-40 feet high: volume 51,269 ft.$^3$
Transfer conveyor maximum angle of inclination: 17°
Conveyor belt: 2 ply min. with fire resistance-flame retardant $3/16"\times 1/16$ covers
Backstop built into electric motor for incline conveyor in case of power failure
Belt cleaning devices: electric rotary brushes.

4—Roller Mill Station Before Waste Fiber is Pulverized at a Transfer Tower:

The incline transfer conveyor from the piles (3) discharges the waste fiber fuel to a roller mill station, and after crushing to reduce moisture, the crushed particulate is transported by incline transfer conveyor to a pulverizer in transfer tower (4).

At this tower, excess fiber fuel (25-30%) returning from the boilers is mixed with the waste pulverization from piles (3).

The roller mill station comprises three rollers similar to the type used to crush sugar cane, in the form of a smaller, more compact unit operating at low speed, with fiber moisture below preferably 45%. Station (4) acts as a bypass that carries the waste to the transfer tower (4) to be pulverized.

Vegetation other than bagasse in the area surrounding such a processing plant also offers, by photosynthesis, a natural energy storage: Thus, wood waste, wood, saw dust, straw, plant stems and leave, any portion of cane left at the field, as well as bagasse, provide a potential calorific value of 6,000 BTU/lb at 20% moisture, by weight, and can generate 3.95 lbs of steam/lb of fiber fuel per hour, and 3,500 Btu/lb at 48% moisture, by weight, generating 2.27 lbs of steam/hr. The pulverization and recirculation system handling much smaller and looser particulates in the preferred method favor vaporization of such vegetative fiber fuels for movement via automated, retrofeeding boiler feeders, increasing efficiency as well.

Density of wet bagasse, 48-50% moisture: 13.55-15 lb/ft.$^3$
Density of wet bagasse in the pile, 45% moisture: 12.55 lb/ft.$^3$
Density of dry bagasse-loose, 10% moisture: 7.84 lb/ft.$^3$
Density (calculated) of waste fibers in the pile station: 9-10 lb/ft.$^3$
Average density of crushed stem & leaf Cameroon cane drying (1) month: 6.5 lb/ft.$^3$
Potential (lbs) of fuel per pile: 66,960 ft.$^3$ @9.5 average lb/ft.$^3$=636,120
Power potential maximum (BTU) per above defined pile: 636,120 lbs (6,000 BTU/lb)=3,816,720,000

5—Pulverized Bagasse from Mills and Pulverized Waste from Piles:

Retractable belt conveyor (5) distributes all the pulverized bagasse from the mills (2a) and the pulverized mixed fiber fuel from the piles (3), throughout warehouse (N) and carries them to cascade chute (1a) via transfer conveyor (12).

The retractable conveyor (5) may drop from either end to form three piles inside warehouse or may create one flat pile using a thrower or booster blower which can distribute the pulverized fiber fuel throughout the area more evenly, increasing fuel storage capacity.

A minimum of 25 feet of free space is necessary at each end of the warehouse (N) from the end of each pile to an edge of the warehouse (N), creating a safety exit space from the top conveyors and for the front end loader to operate when the warehouse is at full capacity.

Pulverized fiber fuel in the warehouse is distributed automatically, by moving retractable conveyor (5) by remote control from a control room.

The daily operation or flow of the pulverized fiber fuel from the warehouse depends on the load curve, during certain peak hours at night extra fuel is needed for the boilers from the warehouse reserve, and for the low load during the day, extra fuel can be carried back.

It is important that the fiber fuel be constantly stirred, mixing and loosening the fibers so that solar energy may be applied thereto in the form of heat to dry the fibers to a moisture content of approximately 10%. The two variable speed conveyors (6) in the tunnel accomplish this goal; one directly from the cascade chute or from the retractable conveyor (5) and the other variable speed conveyor (6) re-circulates fiber fuel received from any hopper.

The dynamics of the recirculation of 25 to 30% of the pulverized fiber fuels, moving the fiber fuels from one place to another, pieces changing places inside the warehouse, help to loosen fibers, thereby avoiding their sticking together, also helping evaporation to reduce moisture via solar heating. Preferred parameters of note are as follows:

Height of concrete walls and foundation for steel columns of building: 12 feet.
Maximum height of piles over the 12 feet concrete wall: 40 feet.
Length of warehouse from door to door: 290 feet.
Warehouse inside width: 100 feet.
Free space from the steel bottom of retractable conveyor to inside top: 22 feet.
Height from the floor to inside top of warehouse: 76 feet.
Distance from the last hopper to an inside wall at both ends: 25 feet.
Numbers of hoppers & distance between hoppers: 13 at 20 feet.

6—Variable Speed Conveyors Control Flow of Pulverized Fiber Fuels to Boilers:

Hoppers are found in the tunnel beneath the warehouse, each one having three major parts: one fixed part hanging and bolted to the concrete [1], gates [2] that swivel on fulcrums welded to the fixed part [1], and another one that swings back and forth on the fulcrums as soon as the gate opens [3], which helps to uniformly deliver the flow of fiber fuel from the hopper to the variable speed conveyor (6), and to reclaim conveyor (7).

The variable speed conveyors (6) control the flow of fuel fibers to the boilers, two in operation, and one spare; the fuel flows through two hoppers at the same time, with high lateral walls to avoid overflow from hoppers in case of power failure.

These variable speed conveyors are 30 feet long, controlled by a master control, receiving signals to open or close hoppers, reduce or increase speed, and move to a new position. They have traction in the double pairs of a set of wheels mounted to railing on top of the reclaim conveyor (7).

The tunnel has at each end reversible air fans either to push or to extract air, capable of maintaining a comfortable temperature in winter or summer, removing impurities, and producing a flow of fresh air. TV cameras and instruments in a control room control operation.

Warehouse—pulverized fiber fuels in one pile: 585,000 cu. ft. (240L×100W×52H)

Warehouse—pulverize fiber fuel in three piles: 495,000 cu. ft. (same warehouse)

Free space from the end of piles to the doors: 25 feet.

Average weight of mixed pulverized fiber fuels in the warehouse: (+/−) 9.5 lbs/cu ft.

Potential (lbs) of fiber fuels in the warehouse: 585,000 cu ft (9.5)=5.557,500

All conveyors—safety device: zero speed—Crouse emergency pull cord switches.

7—Retrofeeding Fiber Fuel from Hoppers to Boilers, and Excess Back to Warehouse:

The reclaim conveyor (7), receiving a controlled flow of pulverized fiber fuel from the variable speed conveyor (6), transfers the pulverized fuel to the conveyor (8), through a curve down chute at the tower (4), and is the one that discharges from a belt conveyor to a drag conveyor through an expanded chute, narrow at the top (belt conveyor) and wider at the bottom (drag conveyor) in a curve angle down to the conveyor (9).

The pulverized fiber fuel is dropped at two or three discharge points from the top to the bottom part of the drag conveyor, and on the way back to the tail shaft, it is distributed to the boiler feeders by opening a stagger at the bottom of the conveyor. The boiler hopper feeders are narrow at the bottom of the conveyor and wider at the feeders to help the flow of the fiber fuel.

At the heat shaft, the drag conveyor (9) has a narrow incline conveyor (10) to collect the loose fibers in the roller chains, carrying some by the steel slats, and dropping them as fuel goes to the feeders. Excess fuel (in the range of 25-30%) is transferred by the conveyor (11) to the transfer tower (4). At this point, the pulverized waste fibers from the piles are mixed with excess fuel returning from the boilers, and conveyor (12) discharges the mixed fiber fuels to the warehouse.

The return of the pulverized fiber fuel conveyors to the warehouse uses the same transfer towers, and the columns supporting the conveyor from the warehouse to the boilers, the walkway, railing, stair and platform having enough space for safety maintenance.

The columns of the boilers are also the support columns for one slope roof in the top of the boilers, and at higher level a double slope roof between boilers, and at the roof top self spin draft fans are provided for better ventilation.

Recirculation of 25-30% of the pulverized fiber fuels returned to the warehouse from the boilers is controlled by an electronic master control by totaling command-signals from two different sources: weighing the fibers going to the boilers by using an electronic scale mounted in the belt transfer conveyors (8), and another similar scale weighing the excess fibers from the boilers, mounted in the conveyor (11).

Maximum grinding rate/(1) drag conveyor: 1,217,000 @/day-13,800 Mt/day of cane Maximum grinding rate/(2) drag conveyors: 27,000 Mt/day of cane.

Outside width of drag conveyors (1) from channel to channel: 8 feet=96 inches.

Conveyor steel slat: height×length, preferably 12×84 inches.

Height of conveyor laterals steel channels at both sides: 15 inches.

Maximum conveyor speed for drag conveyors: 120 feet/min.

DETAILED DESCRIPTION OF REPRESENTATIVE EMBODIMENTS

Shown throughout the Figures, the invention is directed to a method for increasing energy output from bagasse for use in a sugar cane processing plant comprising the steps of:

grinding the bagasse in a grinding mill;

pulverizing the ground bagasse to a particle size no greater than ⅛ inch in diameter;

drying the pulverized bagasse to a moisture content of approximately 10% by weight; supplying the dried pulverized bagasse to boilers of the sugar cane processing plant to power same by an automated retrofeeding system from a storage warehouse; and utilizing excess available dried pulverized bagasse to provide energy for any electrical generation plant local to the sugar cane processing plant.

Using the proposed method, instead of transporting the bagasse directly from the last mill to the boilers, it is sent to a transfer station where it is pulverized to a particle size of no greater than ⅛ inch in diameter, and then transported to the warehouse with hoppers and automatic gates. The waste fiber stored in piles is also pulverized and is mixed with excess fiber fuels returning from boilers and transported to the warehouse. The mixed pulverized material is discharged into the tunnel under the hoppers, creating a flow regulated by an electronic master control, and a variable speed conveyor on top of a transfer conveyor, which take it to the boilers, returning a controlled excess flow back to the warehouse.

Pursuant to the operation of this factory, raw sugar, ethanol, and other products are produced, totally independent of the power plant. This is a very important as this allows the factory to maintain a constant and uniform flow of fuel to the boilers, avoiding interruptions due to the typical breakdowns associated with the grinding season, maintenance, or lack of sugar cane.

The new way of handling the fuel to the boilers is accommodated by simultaneously operating two (2) different systems: one for the production of sugar, ethanol, or other products, and another for generating electricity, not only for the plant but also for the entire region, towns, and cities near or around the sugar cane factory. This goal may be reached by transporting the pulverized bagasse directly to the power plant, instead of to the boilers. It is then mixed with woods chips and other fibers from the cane, namely leaves from the field, dry vegetative waste, etc., which may be fed back in a closed automatic system to the boilers. By utilizing cane fibers and other vegetative material from the sugar cane fields, approximately 30% of the fiber content thereof is collected for use in the method.

The generation of electricity using traditional methods depends on many factors associated directly with production and maintenance. However, there are others like rain, lack of sugar cane, deterioration in the bagasse fibers, etc., which cannot be controlled or predicted during the daily operation of the plant. All these factors define a negative effect on the operation of the boilers, justifying why oil is still being used, as bagasse is still perceived as an unreliable energy source.

Bagasse from the last mill is a bulky and high density material, with the tendency of becoming hardened when drying out. Thus, it has been found to be most effective when the moisture content is maintained at approximately 10%. If this material is kept in an open field, much of its heating value is lost. The heating value, as a function of moisture using the Lipinski curve, goes from 3500 Btu/lb at 48% by weight to 6000 Btu/lb at 20% by weight. As general indicators 2.27 lbs/hr of steam can be generated per lb/hr of this fuel at 48% moisture by weight, and would be closer to 3.93 lbs/hr at 20% moisture by weight, nearly doubling presently available energy output. The output further increases dramatically when moisture content is maintained at approximately 10%.

The power plant in the center, the grinding mills in front, boilers in the back and designed using the modules (8), is a solution that could be adjusted to different regions with more or less land, and population. The only thing that is necessary to adjust is the length of the modules; all of them must have the same width and span for the use of the traveling crane and also have enough space to accommodate equipment for the production of raw sugar or ethanol at different levels.

The improved method for handling and processing sugar bagasse shown in the schematic flow of fiber fuel through the plant as shown in FIGS. 1-7, is a typical solution for a new sugar cane processing plant, and for existing sugar cane processing plants using only bagasse as fuel, or for those needing increased power plant capacity. Such increase can be created using vegetative waste fibers, other than bagasse, from the region, instead of imported oil.

ADVANTAGES OF THE IMPROVED ELEMENTS OF THE INVENTION

Brief description of the different elements:
a) It creates two different systems: one for sugar cane juice and another one for generating electricity;
b) The new plant layout including (8) modules allows the use of traveling cranes during construction, and can also be used later for repair and maintenance purposes;
c) It allows the use of cranes with long arms, between modules, for mounting the clarifiers, liming tanks, pump station, and other equipment for the purification of the sugar cane juice;
d) The extra space available in the new plant layout allows the use of traveling cranes for construction and assembling at the same time, as well as a double access for vehicles and workers;
e) In front and around the power plant there are two tunnels for piping, interconnections, and free space for walking to other modules or to the elevators;
f) The boilers are very close to the power plant, which is also close to the grinding mills (tandems), which help piping, and inter-connections;
g) Belt conveyors are used for transporting bagasse and waste fibers through the whole system, which is a very reliable method. Only steel drag slat conveyors are used for the distribution of fuel to boilers;
h) The recirculation of 25-30% of the pulverized fuel mix prevents cool air from entering through the feeders to the furnace of the boilers;
i) The pulverized mix fuel from the storage flow through hoppers to (2) belt conveyors of 30 feet long with a variable speed, controlled by a master control, receiving signals to open or close hoppers, reduce or increase speed, and to move to new positions, all in one (1) fuel feeding automatic control system, capable of responding to the daily demand of the load curve of areas around the plant.

While the preferred embodiments of the invention have been described above, it will be recognized and understood that various modifications may be proposed without departing from the teachings of the invention and the appended claims are intended to cover all such modifications, which may fall within the spirit and scope of the invention.

What is claimed is:

1. A method for increasing energy output from bagasse for use in a sugar cane processing plant comprising the steps of:
grinding the bagasse in a grinding mill;
pulverizing the ground bagasse to a particle size no greater than ⅛ inch in diameter;
drying the pulverized bagasse;
delivering the dried pulverized bagasse to a storage warehouse, from which pulverized bagasse is automatically transported to boilers of the sugar cane processing plant to power said boilers;
delivering unburnt excess pulverized bagasse from the boilers to the warehouse, and allowing the excess pulverized bagasse to mix with the pulverized bagasse in the warehouse to form a mix, so that the excess pulverized bagasse is automatically retro-fed to the boilers, the mix becoming dried to a moisture content of approximately 10% by weight; and
utilizing excess available dried pulverized bagasse to provide energy for operation of an electrical generation plant local to the sugar cane processing plant.

2. The method of claim 1, wherein wood chips and dry vegetative waste collected from sugar cane fields and other agricultural areas local to the sugar cane processing plant is also pulverized to particles of substantially the same size as those of the pulverized bagasse and added to the pulverized bagasse.

3. The method of claim 2 wherein the bagasse, wood chips and dry vegetative waste are dried to contain less than 20% moisture by weight.

4. The method of claim 3 wherein the bagasse, wood chips and dry vegetative waste are dried to contain less than 10% moisture by weight.

5. The method of claim 1, wherein pulverization is accomplished at a transfer tower of the sugar cane processing plant.

6. The method of claim 1 wherein a roller mill station including rollers is used to crush the bagasse prior to pulverization.

7. The method of claim 3 wherein the pulverized bagasse is distributed about and blown about an area defined as a storage warehouse to assist in drying to a moisture content of less than 20% by weight.

8. The method of claim 7 wherein the pulverized bagasse is distributed about and blown about an area defined as a storage warehouse to assist in drying to a moisture content of approximately 10% by weight.

9. The method of claim 2 wherein no less than 25% by weight of processed and field collected sugar cane material comprises fiber for use in the method.

10. The method of claim 9 wherein no less than 30% by weight of processed and field collected sugar cane material comprises fiber for use in the method.

11. The method of claim 1 wherein the drying is accomplished using solar heating.

12. A method for increasing energy output from bagasse for use in a sugar cane processing plant comprising the steps of:
grinding the bagasse in a grinding mill;
pulverizing the ground bagasse to a particle size no greater than ⅛ inch in diameter;
drying the pulverized bagasse
delivering the dried pulverized bagasse to a storage warehouse, from which pulverized bagasse is automatically transported to boilers of the sugar cane processing plant to power said boilers; and
delivering unburnt excess pulverized bagasse from the boilers to the warehouse, and allowing the excess pulverized bagasse to mix with the pulverized bagasse in the warehouse to form a mix, so that the excess pulverized bagasse is automatically retro-fed to the boilers, the mix becoming dried to a moisture content of approximately 10% by weight.

* * * * *